US 7,870,122 B2

(12) United States Patent
Nath et al.

(10) Patent No.: US 7,870,122 B2
(45) Date of Patent: Jan. 11, 2011

(54) SELF-TUNING INDEX FOR FLASH-BASED DATABASES

(75) Inventors: Suman K. Nath, Redmond, WA (US); Aman Kansal, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 11/739,018

(22) Filed: Apr. 23, 2007

(65) Prior Publication Data

US 2008/0263061 A1 Oct. 23, 2008

(51) Int. Cl.
*G06F 17/30* (2006.01)
(52) U.S. Cl. .................................... 707/715
(58) Field of Classification Search ........... 707/711, 707/715
See application file for complete search history.

(56) References Cited

U.S. PATENT DOCUMENTS

| 5,794,242 | A | 8/1998 | Green et al. |
| 5,864,657 | A | 1/1999 | Stiffler |
| 6,154,877 | A | 11/2000 | Ramkumar et al. |
| 6,895,416 | B2 | 5/2005 | Gara et al. |
| 7,058,849 | B2 | 6/2006 | Erstad |
| 2003/0038803 | A1 | 2/2003 | Morein et al. |
| 2005/0071336 | A1 | 3/2005 | Najork et al. |
| 2005/0187917 | A1* | 8/2005 | Lawande et al. ............. 707/3 |
| 2005/0253741 | A1 | 11/2005 | McCartney et al. |
| 2007/0061544 | A1 | 3/2007 | Uppala |
| 2007/0233683 | A1 | 10/2007 | Verma et al. |
| 2008/0263061 | A1 | 10/2008 | Nath et al. |

OTHER PUBLICATIONS

Padala, "A Log Structured File System with Snapshots", at <<http://logfs.sourceforge.net/lfs.pdf>>, University of Michigan, Jul. 22, 2005, pp. 1-7.
Rosenblum, et al., "The Design and Implementation of a Log-Structured File System", at <<http://www.cs.berkeley.edu/~brewer/cs262/LFS.pdf>>, Proceedings of the 13th ACM Symposium on Operating Systems Principles, Oct. 1991, pp. 1-15.
Wu, et al., "An Efficient B-Tree Layer for Flash-Memory Storage Systems", at <<http://www.cis.nctu.edu.tw/~lpchang/papers/rtcsa03_btreeflash.pdf>>, The 9th Intl Cof on Real Time and Embedded Computing Systems and Applications (RTCSA 2003), 2003, pp. 1-20.
Yazti, et al., "MicroHash: An Efficient Index Structure for Flash-Based Sensor Devices", at <<http://www.cs.ucr.edu/~vana/microhash.pdf>>, In 4th USENIX Conf on Files and Storage Technologies (FAST 2005), Dec. 2005, 14 pages.

* cited by examiner

*Primary Examiner*—Pierre M Vital
*Assistant Examiner*—Truong V Vo
(74) *Attorney, Agent, or Firm*—Lee & Hayes, PLLC (57) ABSTRACT

Techniques for self-tuning indices for databases, including flash-based databases, are described. Using a data tree structure wherein the nodes of the data tree may operate in two modes (e.g. disk mode or log mode), a self-tuning index determines whether it is more economical to perform a requested operation on a node in its current mode or in an alternate mode. The operation is then performed on the node using the more economical mode.

12 Claims, 5 Drawing Sheets

SELF-TUNING INDEX FOR FLASH-BASED DATABASES

CROSS-REFERENCE TO RELATED APPLICATIONS

This patent application is related to co-pending, commonly-owned U.S. patent application Ser. No. 11/739,011 entitled "Efficient Access of Flash Databases" filed concurrently herewith on Apr. 23, 2007, which application is incorporated herein by reference.

BACKGROUND

Current databases are typically designed for the storage and interface characteristics of hard-disk devices. An alternative form of storage device, however, is a flash device. While flash-based storage devices were not common in previous databases, recent technology improvements in flash device storage capacities have made the use of flash devices in databases more feasible. The increasing use of mobile and low power devices further motivates the use of flash devices in such mobile devices because hard disks may be prohibitively heavy or energy intensive.

A key feature of flash storage devices is that their characteristics vary depending on the interface used to access the flash device. A flash device may be accessed through many different interface types, such as in a USB (Universal Serial Bus) stick, in a compact flash card, a secure digital (SD) card, a mini-SD card, a micro-SD card, or in a printed circuit board of a mobile or embedded device. While speed of data transfer across the interface may not be a bottleneck, differences exist in the nature of low level flash management implemented behind the interface by the flash device manufacturer. The performance of the flash-based database and the underlying indexing algorithm depends on the characteristics of the flash device as observed through each specific interface.

Because the characteristics of flash storage devices are significantly different from hard disks, the use of indexing methods designed for hard disk storage leads to performance penalties. Although this issue may be addressed by designing indexing methods optimized for flash storage device with a given interface, it is often not known in advance which of the flash device interfaces the user of the mobile or embedded device may use. Also, the same database product may have to be used on multiple mobile and embedded devices, each using a different interface to access the flash device.

Performance of a flash storage device also depends on the storage workload characteristics. The term workload characteristics refers to the number of reads and writes of the data and index structure, and depends on (1) data query types, (i.e., how often the data is read, how often it is changed or added), and (2) the correlation characteristics of the data stored that affect the structure of the index tree built by the database and that cause the number of reads and writes in the update process to vary. Unfortunately, existing database products are typically not well-suited for flash storage device characteristics, particularly for storage workloads that may be highly write intensive or that require a substantial degree of flexibility.

SUMMARY

Techniques for implementing self-tuning indices for databases, including flash-based databases, are described. Generally, using a data tree structure wherein the nodes of the data tree may operate in two modes, a self-tuning index determines whether it is more economical to maintain a node in its current mode or in an alternate mode, with respect to the read and write workload observed. The more economical mode is chosen and read-write operations are performed on the node using the more economical mode.

More specifically, in one implementation, a request is received for an operation on a node of a data structure, and a current mode of the node is determined. A working variable is incremented by a difference between a first cost of performing the operation in the current mode and a second cost of performing the operation in an alternate mode. It is also determined whether the working variable is at least equal to a sum of a third cost of translating the node from the current mode to the alternate mode and a fourth cost of translating the node from the alternate mode to the current mode. If the determination is affirmative, the node is switched from the current mode to the alternate mode, the working variable is set to zero, and the operation is performed on the node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items.

DETAILED DESCRIPTION

Techniques for implementing self-tuning indices for databases, including flash-based databases, are disclosed herein. Generally, for a database of a storage device having a data tree structure, nodes of the data tree may be configured to operate in two modes, and operations on the nodes may be performed via an index. Based on the actual sequence of requests for read and write operations on each node of the tree structure, a self-tuning algorithm determines whether it is more economical to maintain the node in its current mode, or in an alternate mode. The operations requested on each node may then be performed in the more economical mode.

Techniques for self-tuning indices in accordance with the present disclosure may advantageously allow an indexing algorithm to tune itself automatically to the characteristics of a storage device as observed through any specific interface used at run time. Although described below in the context of flash devices, the self-tuning algorithm is generic and can thus be used on other storage devices, such as emerging technologies of Ferroelectric Random Access Memory (FRAM), Magnetoresistive Random Access Memory (MRAM), or even hard-disk based devices Therefore, the performance of the memory may be improved, as well as the performance of the devices, sensor networks, and other components and systems that use such memories.

Exemplary Environment

Figure 1:
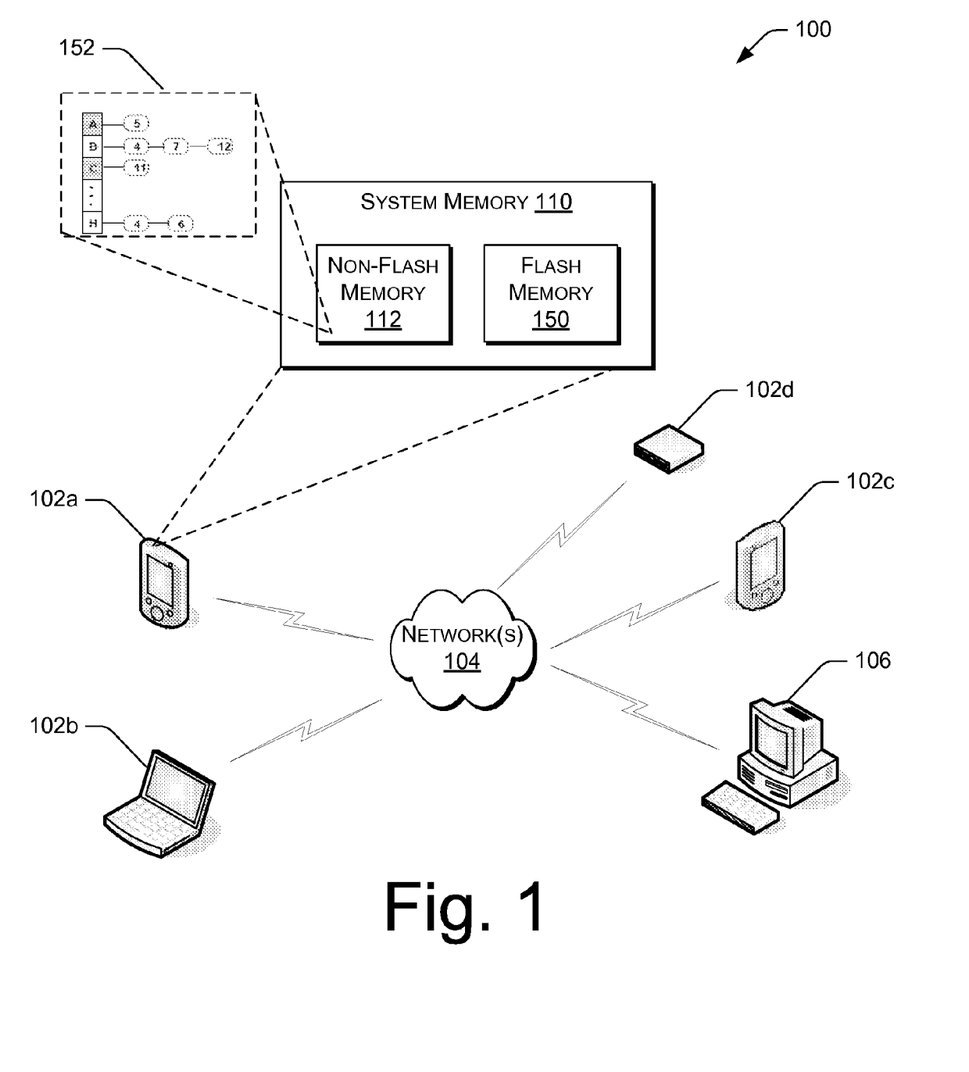
FIG. 1 illustrates an exemplary environment for implementing techniques for self-tuning indices for databases, including flash-based databases.

FIG. 1 illustrates an exemplary environment 100 for implementing self-tuning indices for databases, including flash-based databases. In this embodiment, the environment 100 includes a plurality of mobile devices 102 (e.g. personal data assistant (PDA) 102a, laptop (or tablet PC) 102b, cell phone 102c, media drive 102d). Each mobile device 102 is coupled by one or more networks 104 to one or more of the other mobile devices 102. A stationary device 106 (e.g. desktop computer) is also coupled to the mobile devices 102 via the network(s) 104. Of course, in alternate embodiments, the mobile devices 102 may include any suitable types of devices having flash memory, and the stationary device 106 may include any other suitable computers or devices.

Figure 3:
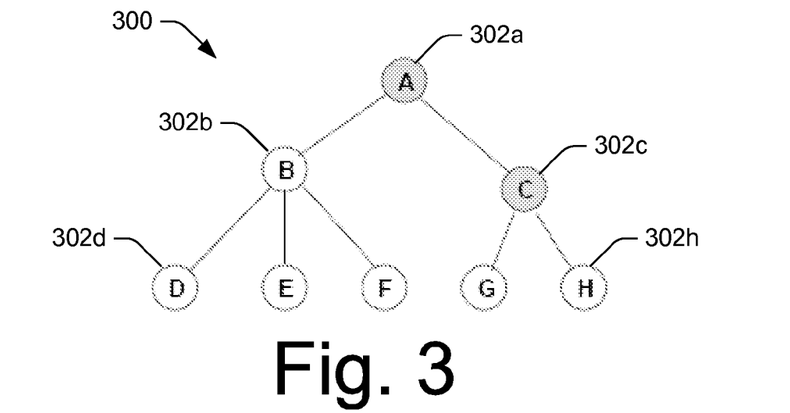
FIG. 3 shows a representative data tree for use in the database of FIG. 2.

As further shown in FIG. 1, at least one of the mobile devices 102 (e.g. a PDA 102a) includes a system memory 110 having a flash memory 150 and a non-flash memory 112. The flash memory 150 stores a data tree having a plurality of nodes (FIG. 3). A node translation table 152 resides in the non-flash memory 112 (e.g. in volatile RAM) and stores log entries associated with nodes of a data tree stored in the flash memory 150. Techniques for self-tuning indices for flash databases in accordance with the teachings of the present disclosure may be implemented in the system memory 110, or any other suitable storage media in the device 102, as described more fully below.

Exemplary Device

Figure 2:
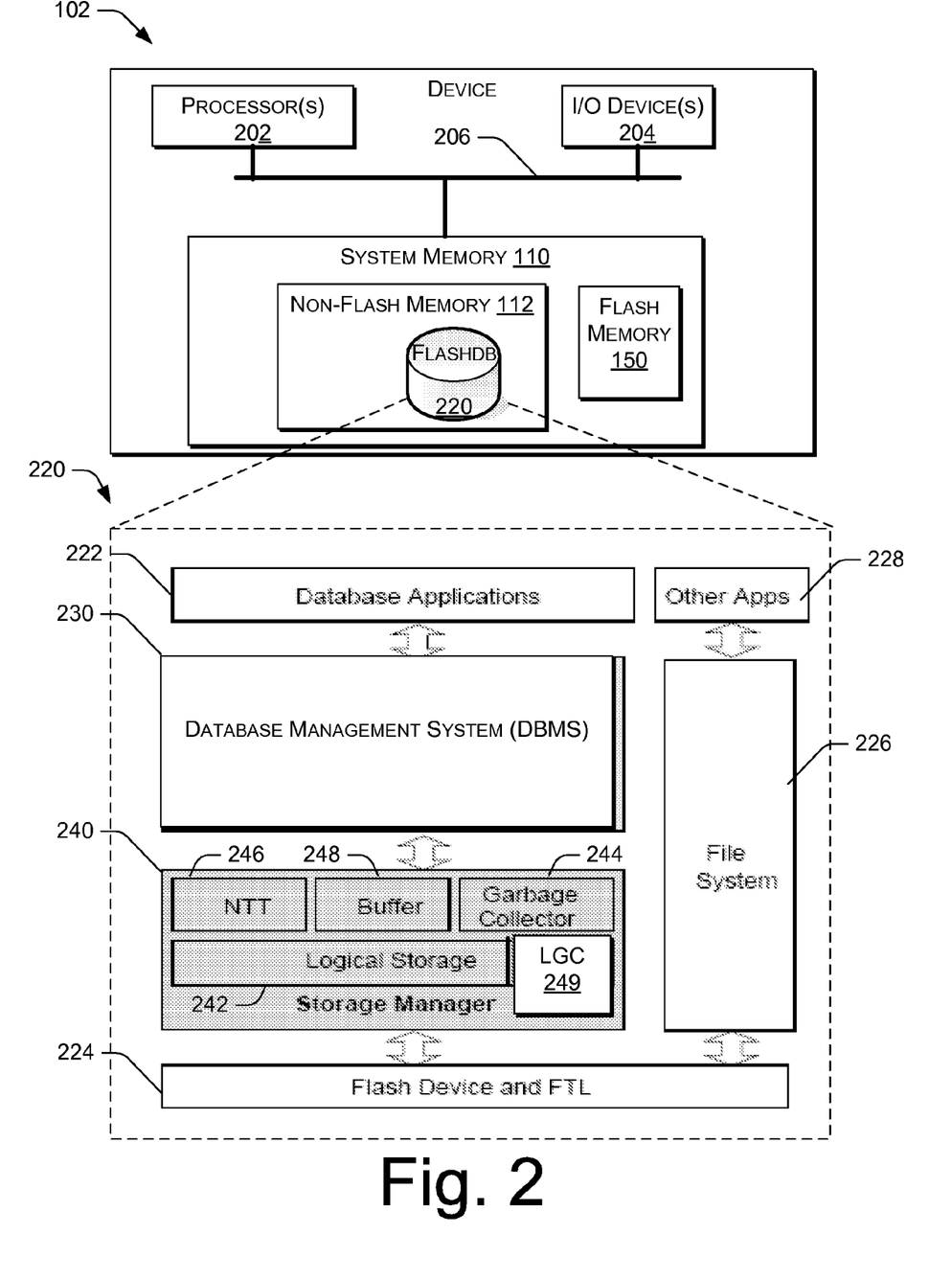
FIG. 2 shows an exemplary device having a flash memory configured to implement self-tuning indices for databases.

FIG. 2 shows an exemplary device 102 having a flash memory 150. In general, the exemplary device 102 represents an abstraction for a typical device which may use flash storage, such as mobile phones, laptops, tablet computers, digital cameras, global positioning system units, devices for recording signatures for deliveries, or any other suitable devices which have a need to store data. Data can be efficiently stored and accessed using a database. The database may include algorithms that execute using a processor and memory of the device 102, indexing structures built by the algorithms to enable fast and efficient retrieval of the data, and the stored data. Self-tuning indices presented in this disclosure are designed to help organize and store data on such flash memory. The indices are stored in the flash memory but the techniques to implement the self tuning algorithm may be stored in any memory including the flash memory. Additional indexing structures and the data may be stored on other persistent storage.

In this embodiment, the device 102 includes one or more processors 202 and one or more input/output (I/O) components 204 (e.g., keyboard, mouse, transmitter, receiver, etc.) coupled to the system memory 110 by a bus 206. The system bus 206 represents any of the several types of bus structures, including a memory bus or memory controller, a peripheral bus, an accelerated graphics port, and a processor or local bus using any of a variety of bus architectures. The system memory 110 includes the flash memory 150 and the non-flash memory 112. The non-flash memory 112 may include any suitable type of non-flash memory, including volatile memory, such as Random Access Memory (RAM), and/or non-volatile memory, such as Read Only Memory (ROM). The non-flash memory 112 may be non-persistent and smaller in size but allows the data stored on it to be changed much faster than on the flash storage device 150.

A flash database (labelled FlashDB) 220 is stored in the system memory 110. The FlashDB 220 is a database compatible with (and in some embodiments optimized for) flash devices. The flash database 220 may be a "self-tuning" database such that, after it is initially configured using the underlying storage device, it may automatically adapt its storage structure in a way that optimizes energy consumption and latency for the workload it experiences. Thus, the flash database 220 may choose different organizations of data on the underlying physical device when subject to different workloads (e.g. with different read/write ratio or different data correlation).

In this embodiment, the flash database 220 includes a database management system 230 that implements one or more database functions (e.g. index manager, query planner, query compiler, etc.), and a storage manager 240 that implements efficient storage-related functionalities (e.g. data buffering and garbage collection). One or more database applications 222 communicate with a flash translation layer (FTL) 224 of a flash device (e.g. the flash memory 150) via the database management system 230 and the storage manager 240. One or more non-database applications 228 communicate with the FTL 224 of the flash device through a file system 226. The database management system 230 may operate in cooperation with a known data structure, such as a $B^+$-tree data structure.

Flash devices are primarily of two types: NOR and NAND. While NOR devices typically have faster and simpler access procedures, their storage capacities are typically lower, and hence NOR devices are typically preferred for program storage rather than data storage. NAND flash offers significantly higher storage capacity (e.g. 32 Gb in a single chip) and is typically more suitable for storing large amounts of data.

Figure 7:
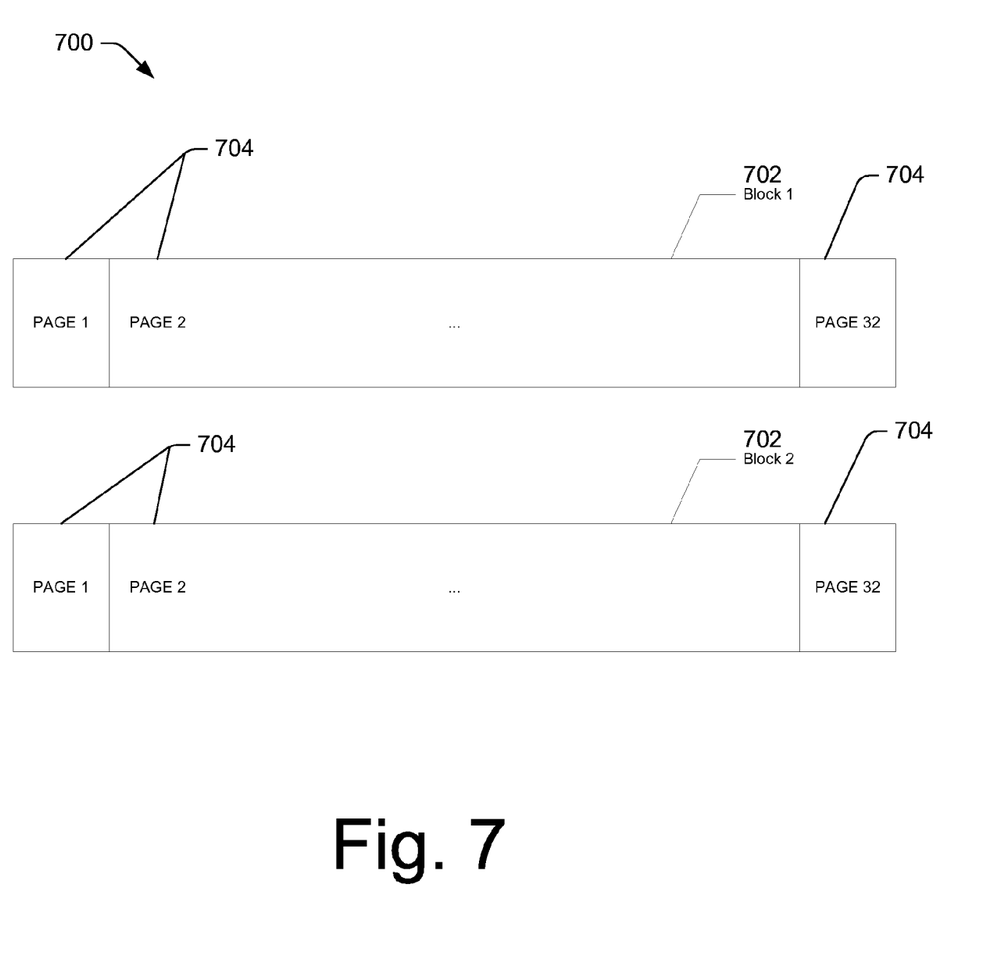
FIG. 7 is an exemplary flash memory structure.

In flash devices, read and write operations typically happen at page granularity (for some devices up to $\frac{1}{8}^{th}$ page granularity). Pages are organized into blocks, typically of 32 or 64 pages. For example, FIG. 7 shows an exemplary flash memory 700 having a pair of blocks 702, wherein each block 702 includes 32 pages 704. A page can only be written after erasing the entire block to which the page belongs. Page write cost is typically higher than read. The block erase requirement makes writes even more expensive, since if a block is to be erased, then pages containing useful data within that block, must be moved to another block before erase. In addition, a block may wear out after repeated writes (e.g. 10,000 to 100,000 writes), and so it is desirable to spread out the write load evenly over the flash device.

The FTL 224 provides a disk-like interface to the flash device that includes the capability to read and write a page directly without worrying about the erase-before-write constraint. The FTL 224 also provides wear leveling by distributing writes uniformly across the media. Typically, the FTL 224 is implemented using a micro-controller within the flash storage device and is hidden behind the interface (such as compact flash, USB, SD) that is used to access the flash memory. However, FTL may be implemented on the processor and memory of the embedded device 102 in some cases.

As further shown in FIG. 2, the storage manager 240 uses the logical storage view of flash memory, 242, provided by the FTL. The logical storage view provides a logical sector address abstraction on top of the physical flash page addresses. Components of the FlashDB 220 that reside over the logical storage 242 access only the sectors of the logical storage 242. through application programming interfaces (APIs). For example, in some embodiments, sectors (also known as pages) of the logical storage 242 are accessed through two APIs, ReadSector and WriteSector.

The logical storage 242 may hide flash-specific complexities using an out-of-place update. In brief, it is known that a block is the smallest unit of erase operation in a NAND flash memory, while reads and writes are handled by pages. Because existing data on flash memory may not be overwritten (updated) unless it is erased first (i.e. in-place updating), it is typically more economical to not overwrite data on update, but rather, to write data to free space, and the older versions of data are then invalidated (or considered as dirty). This practice is known as out-of-place updating. Using out-of-place updating, when the API WriteSector (addr, data) is called, the logical storage 242 finds the next unused physical page p, writes data to it, and maintains a mapping from a logical address addr to a physical page p. The page previously mapped by addr is marked "dirty." The mapping from the logical address addr to a physical page p required for out-of-place updating may be maintained using a structure table, labeled node translation table (NTT) 246 in the figure, in the non-persistent random access memory.

With continued reference to FIG. 2, the storage manager 240 also includes a garbage collector 244 that cleans dirty pages produced by the logical storage 242. Since a page cannot be erased independently, the garbage collector 244 first chooses a flash block containing dirty pages. Then valid pages of the block are copied to another block, and finally, the block is erased.

The storage manager 240 may be configured with a partition (not shown) of the physical storage space. Other non-database applications 228 bypassing the storage manager 240 using, for example, the file system 226, operate outside this partition. The storage manager partition can be grown or shrunk dynamically. Growing the partition does not affect existing data. Subsequent API operations (e.g. Alloc and WriteSector) take this additional physical space into account. Shrinking the partition, however, typically requires remapping used sectors and copying their data to pages within the new partition.

As further shown in FIG. 2, the storage manager 240 also includes a node translation table (NTT) 246, a log buffer 248, and a log garbage collection (LGC) component 249. The functionalities of these components will be described below in association with an index structure used by the flash database 220.

The data stored on the flash is organized using an index tree. More specifically, FIG. 3 shows a representative index tree 300 to store data. In this embodiment, the data tree 300 includes a plurality of index nodes 302 configured in a B⁺-tree data structure. In general, the B⁺-tree data structure is a popular indexing data structure known for efficiently supporting queries and operations, and used in various incarnations in different database systems. The self tuning techniques are used to decide the mode, described below, of each node in the index tree.

In some embodiments, the data tree 300 is flexibly configured to store index nodes 302 in one of two modes denoted as Log mode and Disk mode. When an index node 302 is stored in Log mode, each node update operation (e.g. adding or deleting data keys) is written as a separate log entry without touching the original node itself. The log entry describes the update that was performed. Thus, to read a node in Log mode, the original node and all its log entries (which may be spread over multiple sectors) need to be read. The descriptions of updates provided by the log entries need to be parsed and applied to the copy of the node in RAM. When an index node 302 is in Disk mode, the whole node is written together in a few consecutive sectors (number of sectors used depends on the node size), and hence reading a node requires reading the just corresponding sectors. At any point of time, some index nodes 302 of the data tree 300 may be in Log mode while others are in Disk mode. Moreover, the index nodes 302 of the data tree 300 may change their mode dynamically as workload or storage device parameters change.

Referring once again to FIG. 2, the log buffer 248 of the storage manager 240 is used only by the index nodes 302 currently in Log mode. When an index node 302 in Log mode is modified, the corresponding entries are temporarily held in the log buffer 248. The log buffer 248 may be flushed to flash when the log buffer 248 has approximately one sector worth of data, advantageously helping to avoid relatively expensive small writes.

Figure 4:
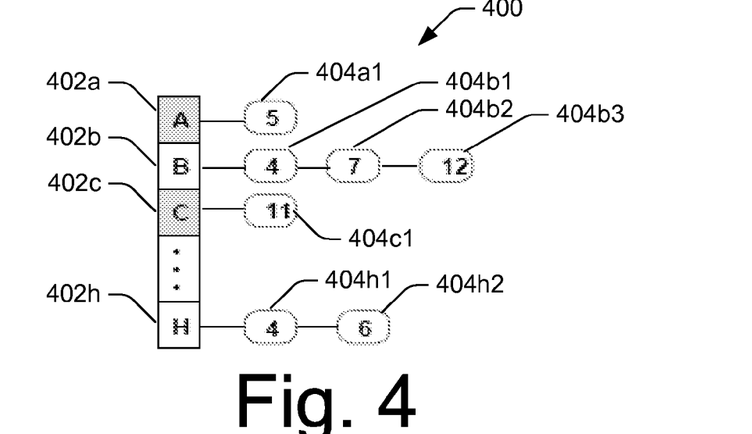
FIG. 4 shows a representative node translation table corresponding to the data tree of FIG. 3.

As previously noted, the mapping from the logical address addr to a physical page p required for out-of-place updating is maintained using a table denoted NTT 246. The node translation table (NTT) 246 of the storage manager also maintains a mapping of each node to its current mode (Log and Disk). For example, FIG. 4 shows a portion 400 of the NTT 246 for the data tree 300 of FIG. 3. In this embodiment, the NTT portion 400 includes a list 402 corresponding to each of the index nodes 302 of the data tree 300. Each sub-list, such as 402a, within 402 corresponds to a single node and includes one or more addresses 404.

The list 402a for the node 302a contains the addresses 404a of the entries relevant to the node 302a. More specifically, for a node in Disk mode, such as the index node 302a, the NTT 246 records the addresses of the sector(s) (e.g. address=5) where the index node 302a is written on flash. Similarly, for a node in Log mode, the NTT 246 maintains a corresponding linked list of addresses of all the sectors (or pages) that contained at least one valid log entry for that node. For example, for the index node 302b, the corresponding list 402b contains three addresses 404b, indicating that the node 302b has at least one log entry in sector 4 (address 404b1), sector 7 (address 404b2), and sector 12 (address 404b3). In brief, the NTT portion 400 maintains a list 402 corresponding to each index node 302 of the data tree 300.

Figure 5:
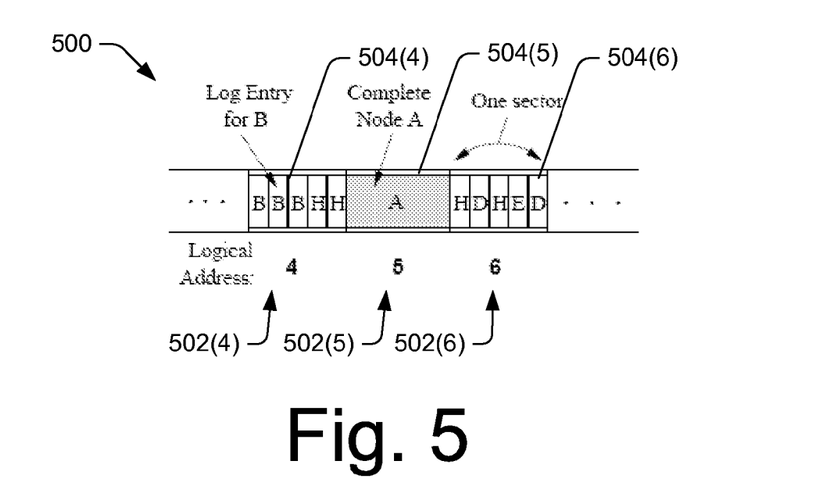
FIG. 5 shows an exemplary portion of a flash storage corresponding to the node translation table of FIG. 4.

A sector (or page) containing log entries of one index node may also contain log entries for other index nodes. For example, FIG. 5 shows an exemplary portion of a flash storage 500 suitable for implementing self-tuning indices for flash databases. The flash storage portion 500 includes three sectors 502 (e.g sectors 4, 5, and 6), and each sector 502 includes one or more log entries 504 corresponding to various index nodes 302 of the data tree 300. In the representative embodiment shown in FIG. 5, the fourth sector 502(4) includes log entries for two index nodes (index node 302(b) and index node 302(h)), and the sixth sector 502(6) also contains log entries for to index nodes (index node 302(h) and index node 302(d)). The fifth sector 504(5) includes log entries for a single index node 302(a). Comparison of the log entries 504 shown in FIG. 5 with the addresses 404 shown in FIG. 4 (e.g. sector 4 contains log entries for index nodes 302b and 302h) reveals the correlation between the NTT portion 400 and the flash storage portion 500.

As is generally known, database operations such as key search, addition, and deletion on a data tree 300 of the type shown in FIG. 3 translate to create, read, and update of the index nodes 302. Given the node translation table (NTT) 400 shown in FIG. 4, we perform these node-level operations as described below.

To create a node with an identifier x, an entry is created with the identifier x with Disk or Log mode in the NTT 400. To read or update the node x, its current mode is first read from the NTT 400. If the node x is in Disk mode, we read the node from or update to the sectors given by the corresponding list 402 for the node x.

Operations on node x in Log mode, however, are more involved. To update node x, a log entry is constructed for the update operation and placed into the log buffer 248 (FIG. 2). Later, when the log buffer 248 has approximately one sector worth of data, all the log entries in the log buffer 248 (corresponding to possibly multiple nodes) are written to an available sector. In some embodiments, the available sector is provided by an API (e.g. Alloc) of the logical storage 242 (FIG. 2). The address 404 of the sector is then added to the linked list 402x corresponding to the node x into NTT 400 (FIG. 4). To read the node x, the log buffer 248 is read, and then all the sectors in the linked list 402x are read to collect log entries for the node x and parse the logs to construct the logical node.

Generally, program modules executed on the device 102 (FIGS. 1 and 2) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, including paper, punch cards and the like, which can be used to store the desired information and which can be accessed by a computer.

Having described an exemplary environment 100 and an exemplary device 102 in which techniques in accordance with the present disclosure may be implemented, exemplary processes for self-tuning indices for flash databases will be described in the following section.

Exemplary Processes for Self-Tuning Indices for Flash Databases

A characteristic of hard disk devices is that the cost of reading a unit of data is typically the same as the cost of writing a unit of data in terms of latency and energy. An indexing structure optimized for such devices is the above-referenced B+-tree data structure used in many existing database products, which may use a known hard-disk based indexing structure (hereinafter "BTD"). In BTD, all nodes of the index tree are in Disk mode.

Consider a hypothetical storage device where the write cost per unit data is infinitely higher than read cost per unit data. An index structure suitable for such storage devices may be a log version of the B+-tree data structure (hereinafter "BTL"). In BTL, all nodes of the index tree are in Log mode. The BTL method decreases the number of writes required by the database for maintaining the index, since for each write or update only a small log entry is written rather than the entire node. The savings in write come the cost of increased number of reads, since for reading a node, instead of reading just a few sectors containing the node, one must read all the sectors which contain one or more log entries corresponding to the node. The BTL method is appropriate for usage in some scenarios where the flash device shows a behavior with very high write cost and low read cost.

Practical flash devices lie somewhere between the two extremes exemplified by the BTD and BTL methods. Such practical flash devices do not have equal read-write costs and hence BTD is typically not appropriate. The write cost of such practical devices is higher, but not infinitely higher, and the BTL method may also be inefficient, depending on the actual read and write costs and the actual number of read and writes observed in the storage workload.

Hybrid Index Structure

Techniques for self-tuning indices for flash databases may use a hybrid index structure that combines the advantages of the BTD and BTL methods. In a hybrid index structure, each node stores information required to relate certain pieces of data with others such that a search for particular data items can be performed efficiently, and this empowers the data access and retrieval capability of the database. The energy and latency cost of executing the database algorithms result from updating the nodes stored in the index structure whenever the stored data is modified or added, and from reading the nodes when some portion of the stored data is accessed. The BTD and BTL indices use different methods to store these nodes.

In the hybrid index structure disclosed herein, such as the index structure described above with reference to FIGS. 1 through 5, each node may be stored in one of two modes: a BTL-like mode, or Log mode, which stores the node in a similar manner as the BTL index structure, or the BTD-like mode, or Disk mode, which stores the node in a similar manner as the BTD index structure. Different nodes may be in different modes and may change their mode over time. The cost of writing a node is typically lower in the BTL mode than in the BTD mode. The cost of reading a node, however, is lower in the BTD mode than the cost of reading in the BTL mode. The hybrid index structure takes advantage of both modes and uses self-tuning techniques to decide the mode of a node. As described below, algorithms for self-tuning indices in accordance with the teachings of the present disclosure keep track of the mode in which each node is being maintained and switch it from mode to another.

Self-Tuning Processes

Processes for self-tuning indices may determine which of the two modes (BTD mode and BTL mode) is being used for each node, and when the mode of each node should be changed. Assume a cost of translating a node from BTD mode to BTL mode is M1, and a cost of translating a node from BTL mode to BTD mode is M2. These costs may be measured in terms of energy consumed and the time spent in carrying out each translation operation.

In some embodiments, each node is initially set to one of the modes, such as the BTD mode. Assume that an operation Op, representing either a read or write operation, is to be performed on a node. Further assume that the cost of performing the operation Op in the node's current mode is C1, and the cost of performing the operation in the other mode is C2. If S is a working variable, then a process for a self-tuning index may include a self-tuning algorithm that includes the following actions:

1. Set S to zero initially;
2. each time an operation Op is to be performed, update S = S + (C1 − C2);
3. whenever S becomes greater than or equal to M1 + M2, switch the node to the other mode and reset S to 0.

While not intending to be bound by theory, it is believed that the self-tuning algorithm given above will not perform more than three times worse than the best possible algorithm that may ever be designed with complete knowledge of the future sequence of read and write operations that will occur as a result of the future workload.

Figure 6:
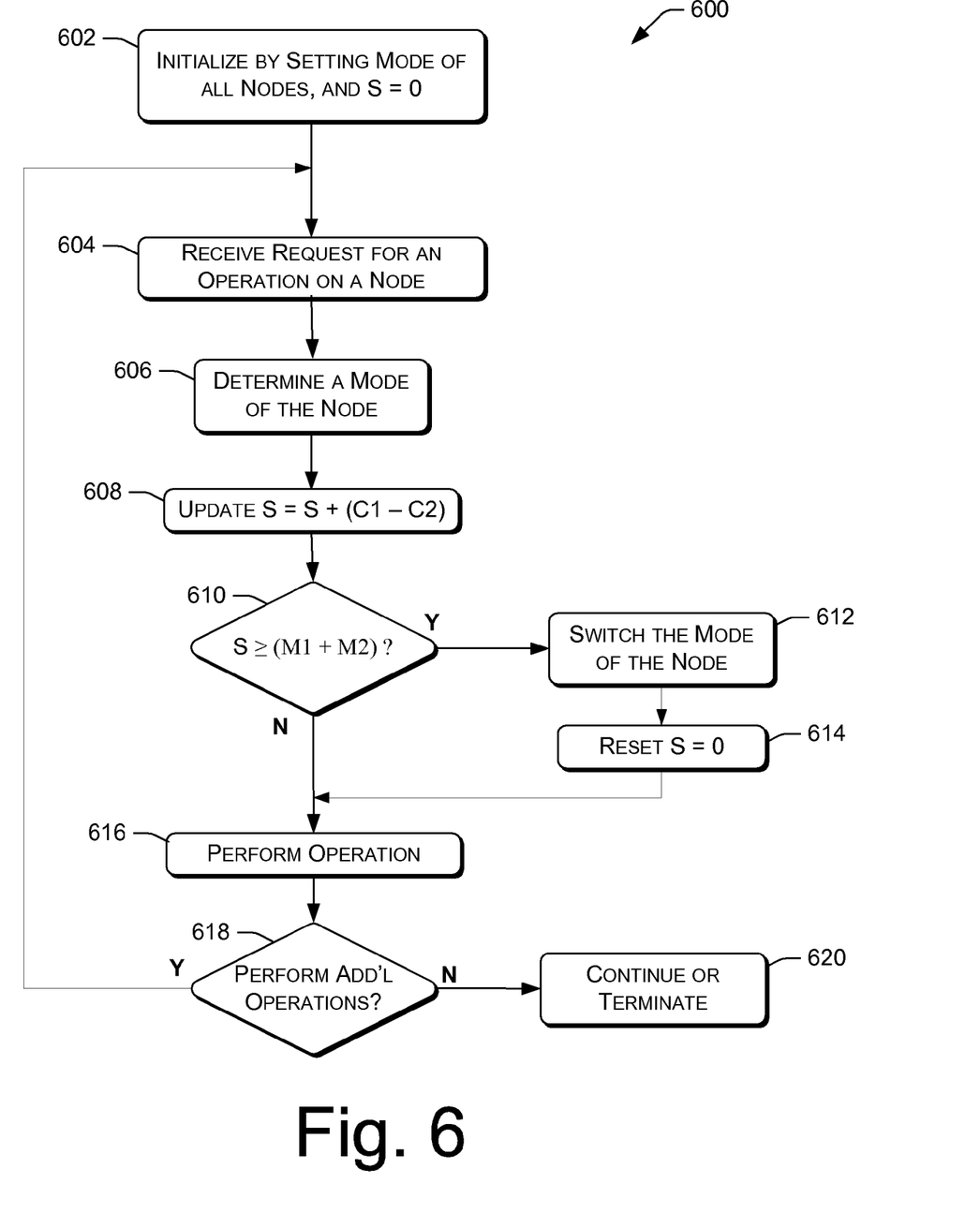
FIG. 6 is a flow diagram of an exemplary process for implementing a self-tuning index for a database, including a flash-based database.

Processes for self-tuning indices for flash databases may advantageously incorporate the self-tuning algorithm shown above. For example, FIG. 6 is a flow diagram of an exemplary process 600 for implementing a self-tuning index for a flash database. The process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 600 is described with reference to the exemplary components described above with reference to FIGS. 1 through 5.

As shown in FIG. 6, at 602, a flash database having a self-tuning index may be initialized by setting all nodes of a data tree to the same mode (e.g. the BTD mode), and setting a working variable S to zero. A request is received for a node-level operation Op (e.g. read or write) at 604. At 606, the process 600 determines a mode of the node involved in the operation.

At 608, the working variable S is updated by adding to it a difference between a cost of performing the operation Op in the node's current mode C1, and a cost of performing the operation Op in the other mode C2 (e.g. S=S+(C1−C2)). Thus, if the cost of performing the operation Op in the node's current mode C1 is greater than the cost of performing the operation Op in the other mode C2 (e.g. (C1−C2)>0), the value of the working variable S is increased. If, however, the cost of performing the operation Op in the node's current mode C1 is less than the cost of performing the operation Op in the other mode C2 (e.g. (C1−C2)<0), the value of the working variable S is decreased. If the cost of performing the operation Op in either mode is the same (e.g. (C1−C2)=0), then the value of the working variable remains constant.

As further shown in FIG. 6, at 610, a determination is made whether the working variable S has become greater than or equal to a sum of a cost M1 of translating a node from BTD mode to BTL mode and a cost M2 of translating a node from BTL mode to BTD mode (e.g. S≧(M1+M2)). If so, the mode of the node is switched to the other mode at 612, and the working variable S is reset to zero at 614. The process 600 then proceeds to perform the operation Op at 616.

If it is determined at 610, however, that the working variable S has not become greater than or equal to the sum of the translation costs (M1+M2), then the process 600 proceeds to perform the operation Op at 616.

The process 600 determines whether additional operations are to be performed at 618. If so, the process 600 returns to receiving requests for operations on a node at 604, and the above-described activities may be repeated indefinitely. Alternately, if no additional operations are desired at 618, the process 600 continues or terminates at 620.

While the above description uses specific examples of all equations involving costs, C1, C2, M1, M2, and working variable S, it may be noted that these equations can be modified using mathematical functions to suit some characteristics that affect the system. For instance, if it is known that the nature of operations, Op's, is likely to depend more on recently observed behavior, the update of the working variable may be modified to S=(1/a)*S+a*(C1−C2), where "a" is a parameter to be adjusted to increase the effect of more recent behavior. Similarly, instead of checking S being greater than M1+M2, a mathematical function of M1 and M2 may be used.

While techniques for implementing self-tuning indices have been described above in the context of flash storage devices, it should be noted that the fundamental algorithm is a generic algorithm that adapts the indexing method to the characteristics of storage devices such as read time, write time, read energy, write energy, and workload parameters. Self-tuning algorithms in accordance with the present disclosure can thus be used on other storage devices, such as emerging technologies of FRAM (Ferroelectric Random Access Memory) storage, MRAM (Magnetoresistive Random Access Memory) storage or even hard-disk based devices. Processes in accordance with the teachings of the present disclosure may lead to improved performance on any of these storage devices in situations where the read and write costs of the device are not equal, and hence the traditional non-self-tuning methods cannot achieve the best performance for varying interface types and workloads. In other cases, the proposed self-tuning algorithm will perform at least as well as the traditional methods.

Techniques in accordance with the present disclosure may advantageously allow a flash-based indexing algorithm to tune itself automatically to the characteristics of a flash storage device as observed through any specific interface used at run time. Therefore, the performance of the flash memory may be improved, as well as the performance of the devices, sensor networks, and other components and systems that use such flash memories.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving a request for a read or write operation on a node of a data structure, the data structure includes a plurality of nodes, and wherein the method further comprises, prior to receiving a request, setting the mode of the plurality of nodes to a same mode and setting a working variable to zero;
   determining a current mode of the node;
   adding, to the working variable, a difference between a first cost of performing the operation in the current mode and a second cost of performing the operation in an alternate mode;
   determining whether the working variable is at least equal to a sum of a third cost of translating the node from the current mode to the alternate mode and a fourth cost of translating the node from the alternate mode to the current mode, wherein the first cost is based on time and energy spent in performing the operation in the current mode, the second cost is based on time and energy spent in performing the operation in the alternate mode, the third cost is based on energy consumed and time spent to translate the node from a disk mode to a log mode, and wherein the fourth cost is based on energy consumed and time spent to translate the node from the log mode to the disk mode, one or more of the first cost, the second cost, the third cost and the fourth cost being dynamically determined based on a measurement of an actual energy consumed and an actual time spent to carry out the request for a read or write operation;

if the determination is affirmative, then switching the node from the current mode to the alternate mode and resetting the working variable to zero; and performing the operation on the node.

2. The method of claim 1, wherein adding to a working variable includes adding to a working variable the difference multiplied by a parameter configured to increase an effect of a recent behavior.

3. The method of claim 1, wherein determining a current mode of the node includes determining whether the current mode is one of a disk mode and a log mode.

4. The method of claim 1, wherein setting the mode of the plurality of nodes includes setting the mode of the plurality of nodes to a disk mode.

5. A device, comprising:
a memory;
one or more processors operatively coupled to the memory and disposed within one or more devices, the memory including:
a data structure having a plurality of nodes, each node being configured to operate in a first mode and a second mode; and
a storage manager configured to operatively communicate with at least the data structure to:
receive a request for an operation on a target node of the data structure;
determine a current mode of the target node;
add to a working variable a difference between a first cost of performing the operation in the current mode and a second cost of performing the operation in an alternate mode;
determine whether the working variable is at least equal to a sum of a third cost of translating the target node from the current mode to the alternate mode and a fourth cost of translating the target node from the alternate mode to the current mode, one or more of the costs is dynamically determined based on a measurement of an actual energy consumed and an actual time spent to carry out the requested operation, wherein first cost is based on time and energy spent in performing the current operation in the current mode, the second cost is based on time and energy spent in performing the operation in the alternate mode, the third cost is based on a third energy consumed and a third time spent to translate the target node from a disk mode to a log mode, and wherein the fourth cost is based on a fourth energy consumed and a fourth time spent to translate the target node from the log mode to the disk mode;
if the determination is affirmative, then switch the target node from the current mode to the alternate mode and reset the working variable to zero; and
perform the operation on the target node.

6. The device of claim 5, wherein the storage manager is further configured to determine the current mode of the target node is one of a disk mode and a log mode.

7. The device of claim 5, wherein the storage manager is further configured to, prior to receiving a request, set the mode of the plurality of nodes to a same mode and set the working variable to zero.

8. The device of claim 5, wherein the memory includes at least one of a flash device, a Ferroelectric Random Access Memory (FRAM) device, a Magnetoresistive Random Access Memory (MRAM) device, and a hard-disk device.

9. The device of claim 5, further comprising:
a processor in operative communication with the memory; and
an input/output device in operative communication with the processor.

10. A method comprising:
generating, by a processor configured with executable instructions, a data tree having a plurality of nodes, each node being configured to operate in a first mode and a second mode, wherein the data tree is configured to operatively communicate with a storage manager to:
set a current mode of the plurality of nodes to a same mode and set the working variable to zero prior to receiving a request;
receive the request for an operation on a target node of the data structure prior to receiving a request;
determine a current mode of the target node;
add to a working variable a difference between a first cost of performing the operation in the current mode and a second cost of performing the operation in an alternate mode;
determine whether the working variable is at least equal to a sum of a third cost of translating the target node from the current mode to the alternate mode and a fourth cost of translating the target node from the alternate mode to the current mode, wherein the data tree is further configured to dynamically determine one or more of the first cost, the second cost, the third cost and the fourth cost based on a measurement of an actual energy consumed and an actual time spent to carry out the request for the operation on the target node of the data structure, the first cost being based on time and energy spent in performing the current operation in the first mode, the second cost being based on time and energy spent in performing the operation in the second mode, the third cost being based on a third energy consumed and a third time spent to translate the target node from a disk mode to a log mode, and the fourth cost being based on a fourth energy consumed and a fourth time spent to translate the target node from the log mode to the disk mode;
if the determination is affirmative, then switch the target node from the current mode to the alternate mode and reset the working variable to zero; and
perform the operation on the target node.

11. The method of claim 10, wherein the data tree is further configured to operatively communicate with the storage manager to determine the current mode of the target node is one of a disk mode and a log mode.

12. The method of claim 10, wherein the data tree is further configured to reside on at least one of a flash device, a Ferroelectric Random Access Memory (FRAM) device, a Magnetoresistive Random Access Memory (MRAM) device, and a hard-disk device.

* * * * *